United States Patent Office 3,221,055
Patented Nov. 30, 1965

3,221,055
NITRATE AND PERCHLORATE SALTS OF POLYETHYLENIMINE
Jack Robins, Allentown, Pa., assignor to Atlas Chemical Industries, Inc., Wilmington, Del., a corporation of Delaware
No Drawing. Filed Dec. 15, 1961, Ser. No. 159,757
7 Claims. (Cl. 260—583)

The present invention relates to nitrate and perchlorate salts of polyethylenimine and to their preparation.

Polyethylenimine, which is a highly polymerized ethylenimine, is a highly hydrophilic material which is difficult, if not impossible, to obtain in dry form. Commercially, it is available in water solution, generally containing on the order of about 50% water.

Prior to this invention, attempts to form nitrate or perchlorate salts of high polymer polyethylenimine by simple acid addition, such as is generally suitable for producing amine salts, has resulted in the formation of liquid or semi-solid substances which are not stable to drying.

In accordance with the present invention, nitrates of high polymers of ethylenimine may be prepared in a solid anhydrous form. It has been found that when a water solution of high polymer of ethylenimine is mixed with a relatively large quantity of a lower aliphatic alcohol and the alcoholic solution neutralized with nitric acid, the resultant nitrate salt of high polymer ethylenimine precipitates from the alcoholic solution in loose fluffy form. It may be obtained in anhydrous form by simple evaporation from the supernatant liquid. The resulting product is highly inflammable but does not appear to be detonatable under ordinary circumstances.

In accordance with the present invention, simple perchlorate salts of high polymers of ethylenimine may be similarly prepared, but the resultant salt remains in solution, and further steps are necessary to obtain it in loose particulate form. This may be accomplished by successively mixing the solution of perchlorate salt with acetone and drying the solution in vacuo and repeating this procedure several times. It has been found that perchlorate salts of high polymer ethylenimine may be obtained without successive evaporations from acetone solution in the same manner as the nitrate salts if the high polymer ethylenimine is first partially neutralized by perchloric acid and subsequently treated with an acid which produces an insoluble polyethylenimine salt in a lower alcohol. Nitric acid, as is evident from the foregoing, is one such acid. Mixed nitrate and perchlorate salts of high polymers of ethylenimine exhibit a desired insolubility in lower alcohols. Hydrochloric acid is an example of another suitable acid and mixed chloride and perchlorate salts may be similarly readily prepared. In order to obtain a desired loose fluffy insoluble salt product which may be separated without the need for acetone evaporation, the proportion of amine groups which are neutralized with an anion forming an insoluble precipitate in a lower alcohol solution should be significant. Degrees of such neutralization above about 20% of the available amine function are usually necessary to produce an insoluble salt which may be dried to produce an anhydrous solid product. By the present invention it is possible to obtain products having a high molar content of perchlorate and nitrate groups. Well over 90% of the available amine groups may be readily reacted to form the desired salts. Suitably the total degree of neutralization is at least 70%. To produce the desired degree of inflammability, the nitrate or chlorate content should be substantial.

The highly polymerized ethylenimines which are particularly suitable for use in accord with the present invention are those which are not available in anhydrous form. Thus, the present invention is applicable for use with polyethylenimines having molecular weights within the approximate range of 30,000 to 45,000.

A commercially prepared polyethylenimine found satisfactory is Polymin P having the following properties: (1) an aqueous solution containing about 50% solids; (2) a molecular weight of between about 30,000 and 40,000 and (3) a nitrogen content of about 16% by weight.

In general, the lower alcohols which may be used in preparation of product of this invention are those customarily used for solvent purposes. For example, methyl, ethyl and isopropyl alcohols are suitable. Methyl alcohol is usually preferred. The amount of alcohol required in order to provide a solution from which the desired salts will precipitate is large. Several times the weight of water present in the polyethylenimine solution and acids used being necessary. In general, it is preferred to use a weight of alcohol at least ten times the weight of water present in the reaction mixture.

The inflammability of the products of the present invention has been mentioned. This property is such that the products are useful for impregnation of combustible materials such as paper or cord for the production of fuse. They are also useful as flame carrying agents in dry fuse compositions or in propellants.

The present invention will be further described by means of the following examples. Each of the examples were carried out at room temperatures.

EXAMPLE I

*The preparation of a polyethylenimine nitrate salt*

12.2 grams of 50% aqueous solution of polyethylenimine were dissolved with continuous stirring in approximately 200 ml. of methyl alcohol. A 97% aqueous solution of nitric acid was added dropwise to the solution with continuous stirring. A precipitate formed with each addition of nitric acid. When no further precipitate formed, further addition of nitric acid was stopped. The precipitate, the nitric acid salt of polyethylenimine, was rinsed once with methyl alcohol by decantation, dried under reduced pressure, and finally dried in vacuo over phosphorus pentoxide. The product was a white, fluffy, coarse powder. The product yield was calculated to be 99.3% as $(-CH_2CH_2NH-)_1(HNO_3)_1$, one mole of

to one mole of $HNO_3$. The nitrogen content of the product was determined by means of a Du Pont nitrometer and found to be 12.10% as compared to 13.20% theoretical. The results of the nitrogen content determination corresponds to a material of the composition

The product was found to be highly deliquescent and after a few hours exposure to the atmosphere, the particles coalesced to form a plastic, translucent gel. On redrying over phosphorus pentoxide, the gel became a soft, sticky translucent solid. Although the powder product was found to be highly soluble in water, it was insoluble in aliphatic alcohols and ketones.

EXAMPLE II

*The preparation of a polyethylenimine perchlorate salt*

To 60% aqueous perchloric acid was added in a dropwise manner with stirring to a 1 ml. portion of a 50% aqueous solution of polyethylenimine. The perchloric acid was added until an acidified solution having a pH of between 1 and 2 was obtained. The resultant solution was dried under reduced pressure to a heavy syrup. About 5 cc. of acetone were stirred into the syrupy solution and the mixture dried by gentle heating to remove acetone and higher volatiles. The acetone leaching step was repeated four times. After the fourth dyring a crusty bubble formed which was crushed to a powder with a stirring rod and stored over phosphorus pentoxide. A Dumas analysis of the product gave a nitrogn determination of 9.88%, as compared to the theoretical value of 9.76%, as $$(-CH_2CH_2NH-)_1(HClO_4)_1$$

The product was very deliquescent, the particles coalescing into a soft, sticky translucent gel after a few hours exposure to the atmosphere. Upon redrying the gel became a soft, sticky translucent solid. The product was found to be very soluble in water and soluble in the lower aliphatic alcohols. In contact with ketones or higher alcohols, the particles of the product coalesced into a heavy viscous liquid.

EXAMPLE III

*The preparation of a mixed perchlorate-nitrate polyethylenimine salt*

13.5 grams of a 50% aqueous solution of polyethylenimine was dissolved in 300 ml. of methyl alcohol. 5 cc. of a 60% aqueous solution of perchloric acid was then stirred in the alcohol-polyethylenimine solution. To this mixture a 96% aqueous solution of nitric acid was added dropwise with stirring until the pH of the supernatant liquid was between 2 and 3. A precipitate formed after the first addition of nitric acid. The supernatant liquid was decanted and the precipitate recovered and dried at reduced pressure. The precipitate was then further dried in vacuo over phosphorus pentoxide. The product was a white fluffy coarse powder having a nitrogen analysis, Dumas 20.35%, Du Pont Nitrometer 7.94%, corresponding to a material having the composition $$(-CH_2CH_2NH-)_1(HClO_4)_{0.293}(HNO_3)_{0.640}$$

After a few hours exposure to the atmosphere, the particulate product coalesced into a translucent sticky gel which when redried formed a soft sticky translucent solid. The product was found to be soluble in water but insoluble in aliphatic alcohols and ketones.

EXAMPLE IV

*The preparation of a mixed perchlorate-nitrate polyethylenimine salt*

11.5 grams of a 50% aqueous solution of polyethylenimine was dissolved in 400 ml. of methyl alcohol. To this solution 11 cc. of a 60% aqueous solution of perchloric acid and approximately 2 cc. of a 96% aqueous solution of nitric acid. Immediately after the nitric acid addition a voluminous precipitate formed. The precipitate was recovered and dried in the manner described in Example III. The product was a white, fluffy, coarse powder having nitrogen analyses of: Dumas 17.98% and Du Pont Nitrometer 6.05%. These analyses correspond to a material of the composition $$(-CH_2CH_2NH-)_1(ChlO_4)_{0.422}(HNO_3)_{0.507}$$

The product had properties similar to the product described in Example III.

EXAMPLE V

*The preparation of a mixed perchlorate-chloride polyethylenimine salt*

10.3 grams of a 50% aqueous solution of polyethylenimine were dissolved in 400 ml. of methyl alcohol. 15 ml. of a 60% aqueous solution of perchloric acid was stirred into the alcohol-polyethylenimine solution. 4 ml. of a 30% aqueous solution of hydrochloric acid was then stirred in. A voluminous white precipitate formed after the addition of the hydrochloric acid. The precipitate was recovered and dried in the manner described in Example III. The resultant product was a white, fluffy coarse powder. An analysis of the material gave: Dumas nitrogen: 12.10%; chlorine: 8.45%. These results correspond to a material having the composition $$(-CH_2CH_2NH-)_1(HClO_4)_{0.626}(HCl)_{0.268}$$

This product had properties similar to the product described in Example III.

What is claimed is:

1. A dry solid salt of a high polymer of ethylenimine having a molecular weight of about 30,000 to 45,000 and an acid selected from the group consisting of nitric acid and perchloric acid.

2. A salt in accordance with claim 1 in which at least 70% of the amine function of said high polymer of ethylenimine is in th form of salt of said acid.

3. A nitrate salt in accordance with claim 2.

4. A mixed perchlorate salt in accordance with claim 2 in which at least 20% of the amine function of polyethylenimine having a molecular weight of from about 30,000 to 45,000 is in the form of a salt of an additional anion selected from the group consisting of nitrate and chloride.

5. A dry solid mixed salt of a high polymer of ethylenimine having a molecular weight of from about 30,000 to 45,000 and perchloric acid, at least 20% of the amine function of said high polymer being in the form of a salt of an additional anion selected from the group consisting of nitrate and chloride, wherein a total of at least 70% of the said high polymer amine function is neutralized.

6. The process for making a nitrate salt of a high polymer of ethylenimine having a molecular weight of from about 30,000 to 45,000 which comprises reacting said high polymer in a mixture of water and a lower aliphatic alcohol, said mixture containing an excess by weight of the alcohol, said alcohol being selected from the group consisting of methyl, ethyl and isopropyl, and neutralizing at least 70% of the amine function of the polymer with nitric acid.

7. The process of making a mixed salt of a high polymer of polyethylenimine having a molecular weight of from about 30,000 to 45,000 which comprises reacting said high polymer in a mixture of water and a lower aliphatic alcohol, said mixture containing a weight excess of the alcohol component, said alcohol being selected from the group consisting of methyl, ethyl and isopropyl, with perchloric acid and in addition, an acid selected from the group consisting of nitric and hydrochloric acid, neutralizing a total of at least 20% of the amine function of said high polymer with an acid selected from said group, and neutralizing a total of at least 70% of the amine function of said high polymer.

References Cited by the Examiner

UNITED STATES PATENTS 2,182,306   12/1939   Ulrich et al. _____ 260—239
3,013,382   12/1961   Doss _____ 260—583 XR

OTHER REFERENCES

Fieser et al.: "Organic Chemistry," Second Edition, D. C. Heath and Company, Boston, pages 222 to 224 (1950).

Schatz: Dissertation Abstracts, volume 15, page 1315 (1955).

Sidgwick's Organic Chemistry of Nitrogen, pages 468–473, 1945.

CHARLES B. PARKER, *Primary Examiner.*